Sept. 7, 1965 P. E. VROMAN 3,204,605
LIVE FISH GRADING APPARATUS
Filed July 29, 1964 3 Sheets-Sheet 1

INVENTOR
PAUL E. VROMAN
BY Ernest S. Cohen
Gersten Sadowsky
ATTORNEYS

Sept. 7, 1965

P. E. VROMAN 3,204,605

LIVE FISH GRADING APPARATUS

Filed July 29, 1964

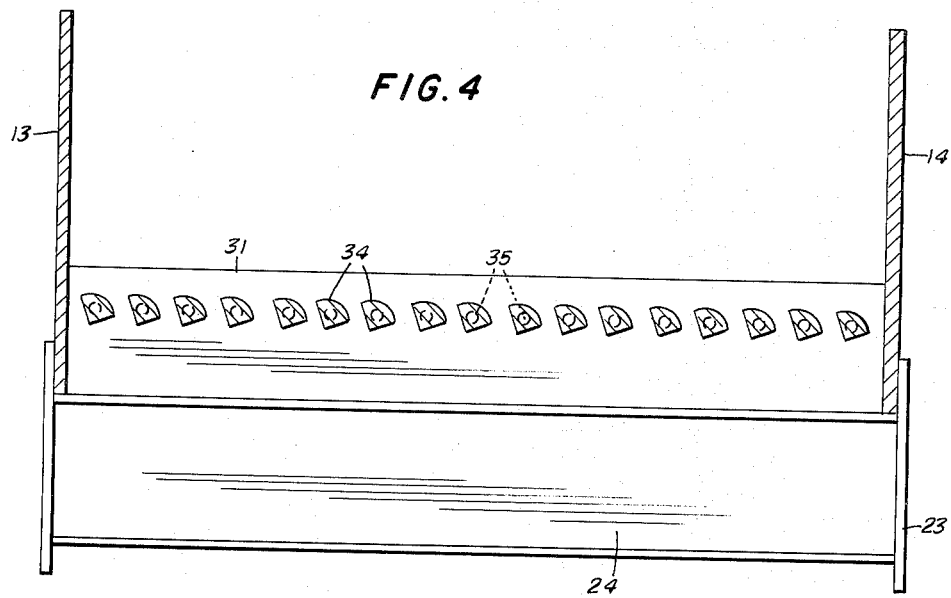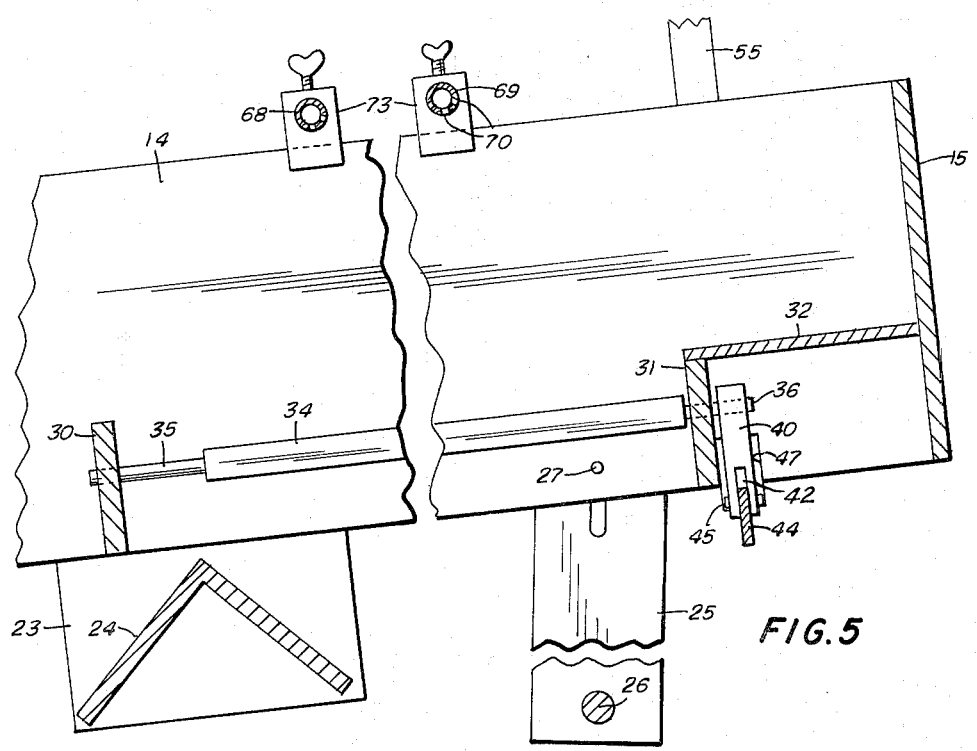

United States Patent Office 3,204,605
Patented Sept. 7, 1965

3,204,605
LIVE FISH GRADING APPARATUS
Paul E. Vroman, Philomath, Oreg., assignor to the United States of America as represented by the Secretary of the Interior
Filed July 29, 1964, Ser. No. 386,099
8 Claims. (Cl. 119—3)

The invention herein described and claimed may be manufactured and used by or for the Government of the United States of America for governmental purposes without the payment of royalties thereon or therefor.

The present invention relates to an improved apparatus having utility in the field of fish culture and the hatchery propagation of fish. This apparatus is particularly adapted for separating small fish into groups according to size.

Processing fish for separation into size groups when they are at an early age and small, is highly desirable since it promotes a more uniform growth of such fish confined on tanks or ponds, prevents cannibalism among the fish, and improves feeding efficiency. Further, the small size of the fish substantially reduces the time and effort that might otherwise be needed for this task because fewer pounds of fish are handled. However, grading smaller fish by size has been difficult in the past due to the inadequacies of machines previously available for this purpose. These machines generally lacked means for accurately setting and regulating the sizes according to which it was intended that the fish be separated. A disclosure of a more basic form of this sort of fish grader may be found in Patent No. 2,690,158, issued to J. Petty on September 28, 1954. A more serious problem often met in grading fish by mechanical means heretofore known, is the gilling of the fish wherein their passage through the sorting devices is interrupted when their gills catch upon structural members of these devices. Attempts to remove the fish from their predicament often resulted in their injury and death. By means of the present invention small fish can be readily sorted or graded without those difficulties encountered using other means.

An object of the present invention is therefore to provide improved means facilitating grading fish into groups according to their size.

A further object of the present invention is to provide a fish grading apparatus having adjustable devices permitting close regulation of the means determining the sizes of the fish as grouped.

A still further object of the present invention is to provide a fish grading machine having means for easily and safely freeing fish caught in the sorting structure of the machine.

These and other objects of the present invention will be more clearly understood from the following description of a preferred embodiment of the invention considered together with the accompanying drawing wherein:

FIG. 4 is a view in a vertical section taken on line 4—4 of FIG. 2; and

FIG. 5 is a fragmentary view in a vertical section taken on line 5—5 of FIG. 3.

Figure 1:
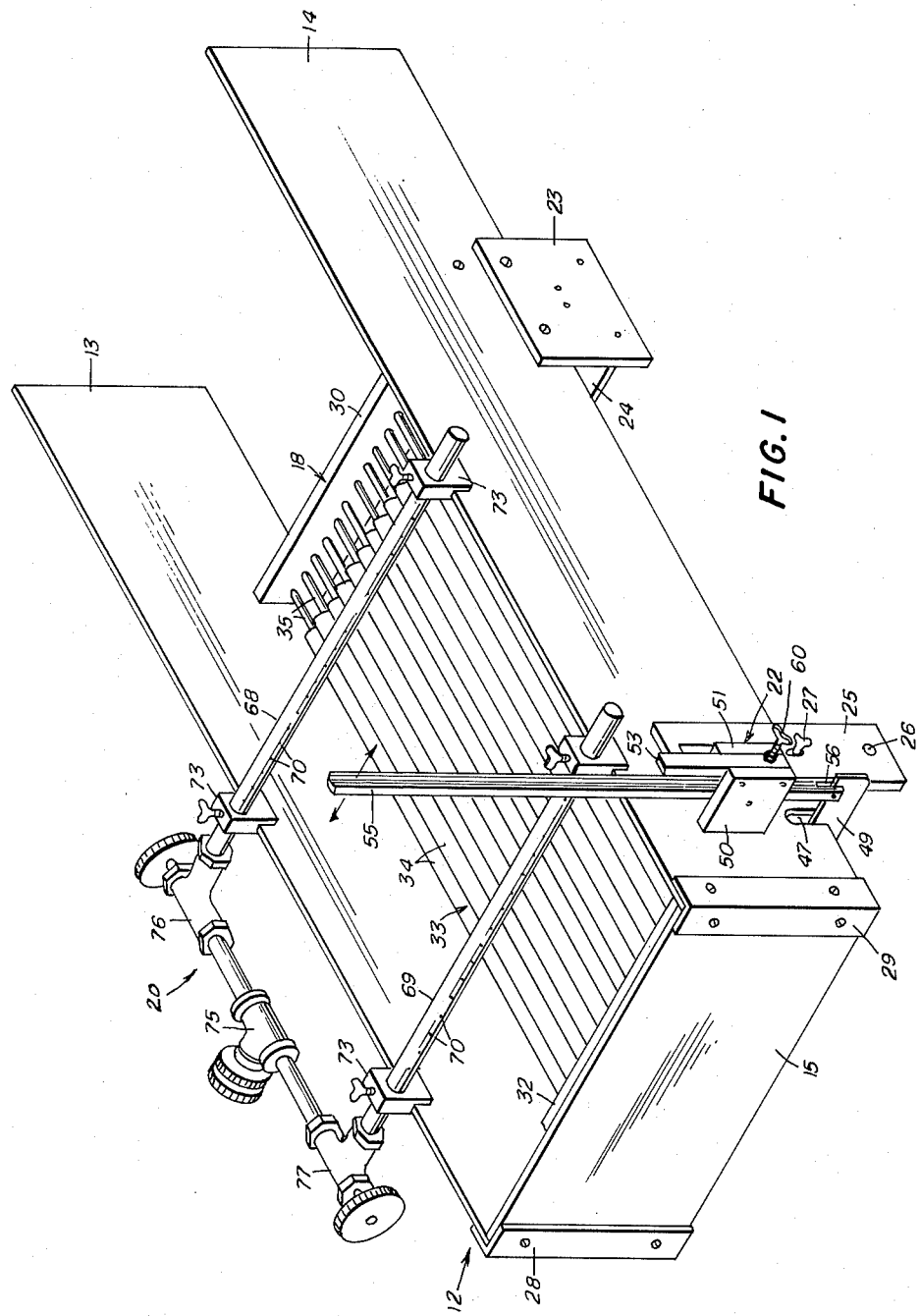
FIG. 1 is a view in perspective of a complete apparatus according to the present invention.

Referring to FIG. 1, the apparatus according to the invention is seen to comprise an open casing 12, made up of sidewalls 13 and 14, and a rear wall 15, forming a trough-like structure within whose lower part is disposed an adjustable grading mechanism 18, above which is mounted a spray means 20, adapted to direct streams of water washing over the working surfaces of the grading structure 18. Further illustrated in FIG. 1, as an attachment to the outer surface of wall 14, is an adjustment control device 22, constituting an integral part of the grading mechanism 18. A plate 23, shown fixed to wall 14 and extending below the lower edge thereof, constitutes one of a pair of similarly disposed plates which support the opposite ends of an inverted V-shaped deflecting element 24, whose specific function will be hereinafter more fully explained. FIG. 1 also shows a slotted plate 25, to which a plate of similar shape on the opposite side of casing 12, is joined by a rod 26, wherby these plates are arranged to be secured to the casing walls by thumb screws 27, operable in threaded openings in the walls. As indicated by the showing in FIG. 5, these slotted plates provide a support or base for one end of casing 12, allowing selective adjustments of the casing's inclination as needed for operating the present invention.

Figures 2, 3:
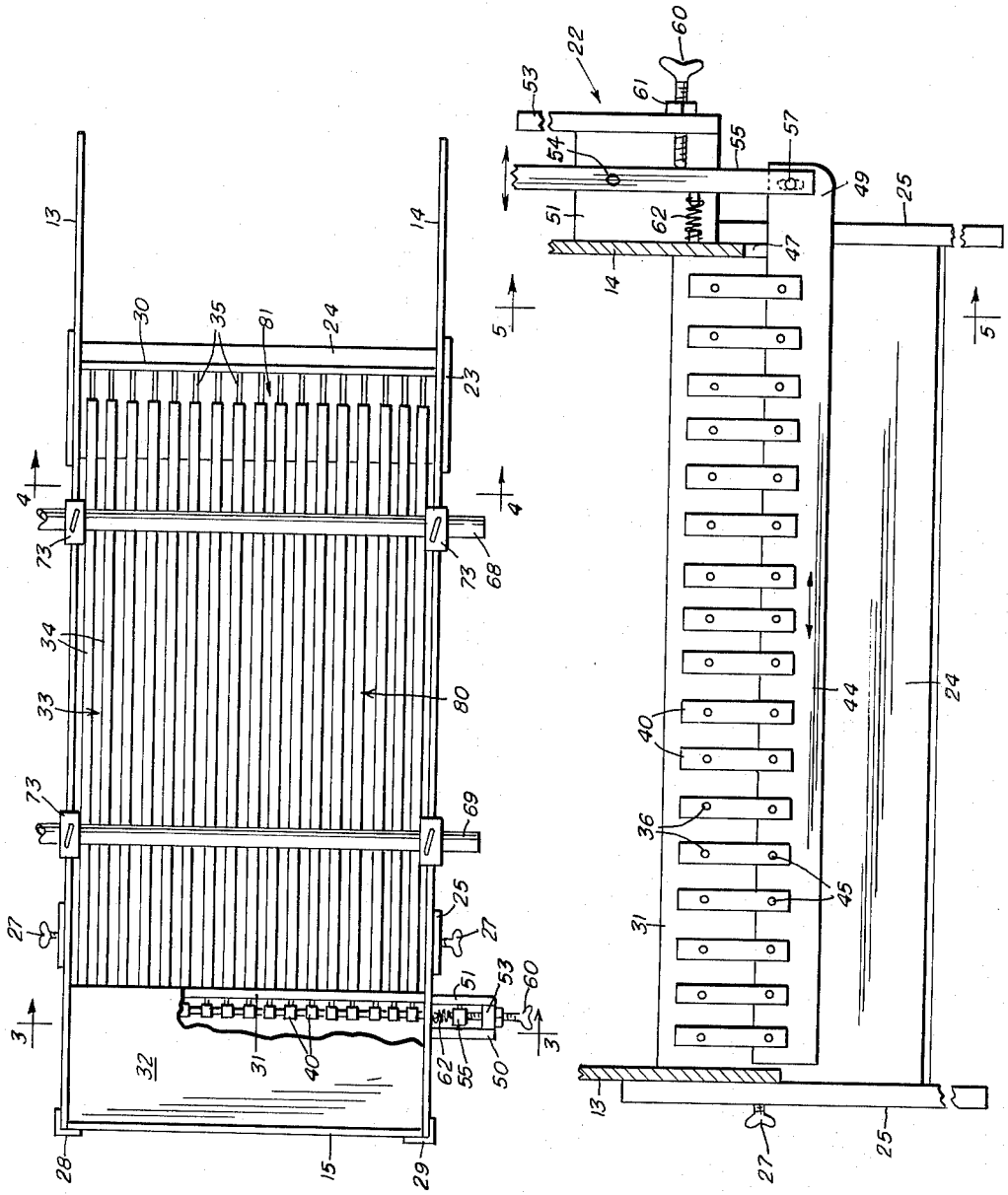
FIG. 2 is a plan view, partly in section, of the apparatus shown in FIG. 1.
FIG. 3 is a view in vertical section taken on line 3—3 of FIG. 2.

Casing 12 obtains a proper rigidity from a pair of right-angle corner brackets 28 and 29, which respectively fix the casing's side walls 13 and 14 to its rear wall 15, and a pair of relatively thick stringer or tie plates 30 and 31, secured to the side walls of the casing. As best seen in FIGS. 2 and 5, plates 30 and 31 are maintained positioned between the inner surfaces of the side walls, parallel to rear wall 15, by connections at widely separated points on the side walls adjacent to the lower edges thereof. A relatively thin plate 32, horizontally disposed to cover over the opening defined by the casing walls and plate 31, is held in place by its attachment to the latter. Spanning the distance between plates 30 and 31 and rotatably supported in openings passing therethrough, are a multiplicity of specially shaped bars 33, which are arranged uniformly spaced from each other in a plane extending across a lower opening in casing 12 defined by walls 13 and 14, and plates 30 and 31. With reference to FIGS 2, 4 and 5, each bar 33 is seen to have a quarter round cross-section along a middle segment 34 thereof comprising the greatest part of its length. Extending from the respective opposite ends of the segment 34 are reduced segments of bar 33, including a rod-like spindle 35, and a similarly shaped shorter spindle 36. As is apparent from the showing in FIGS. 1, 2 and 5, the aforementioned support for adjustable bars 33 is accomplished when portions of spindles 35 and 36 are rotatably disposed within parallel arrays of aligned holes with which plates 30 and 31, respectively, are furnished.

Securely fixed to extended portions of the multiplicity of spindles 36 shown in FIGS. 3 and 5, are a corresponding multiplicity of pivot arms 40. As is evident from these figures, each arm 40 is a relatively short, narrow bar having holes traversing its width close by the opposite ends thereof, and a relative deep open slot 42 cut into its lower end to pass across the hole at that end. The holes in the upper parts of arms 40, receive the extended ends of spindles 36 which are secured in these holes by set screws or the like. A rake bar 44 is provided as a driving means for arms 40, wherby they are operative as cranks to pivot the respective bars 33 together through equal arcs not exceeding about forty-five degrees. Rake bar 44 is essentially a rigid strap having in an upper section thereof, a multiplicity of aligned holes arrayed parallel to the holes in support bars 30 and 31. The respective open slots 42 of arms 40, are adapted to receive within them this upper section of rake bar 44, such that the openings of the individual holes therein are aligned with the openings of the respective holes in the lower parts of the separate arms 40. Suitable pivot pins 45, passing through these aligned holes, are secured to the arms 40 whereby any lateral displacement of the rake bar swings the arms and rotates the bars 33 joined therto accordingly. An open slot 47 of appropriate size in the lower edge of casing wall 14, provides a passage through which an extended end 49 of rake bar 44 projects into an operative connection with the adjustment control device 22.

Referring particularly to FIGS. 1, 2 and 3, adjustment control device 22 is seen to comprise a pair of spaced-apart blocks 50 and 51, attached to casing wall 14 by conventional fasteners so as to straddle an area immediately above the wall slot 47. Blocks 50 and 51 are joined by an upstanding bar 53, securely held flush with the extended edges of the blocks, to form an integral support structure for the control device. Pivotally supported on a rod 54 passing between 50 and 51 and securely held therein, is a lever 55. As shown in FIG. 1, the lower end of lever 55 projects below the blocks, and has an open slot 56 in which a part of the rake bar end 49 is located. A pivot pin secured in lever 55 traverses open slot 56 by passing through a closed slot 57 in rake bar end 49. As is manifest in FIG. 3, lever support rod 54 is suitably located by its connections in blocks 50 and 51, to allow the driving end of lever 55 adequate movement to shift rake bar 44 a distance sufficient to pivot arms 40 through a full operative arc. Provisions made to obtain a controlled positioning of lever 55 include a manipulatable screw 60, displaceable in a threaded collar 61 fixed to bar 53, and a compression spring 62, seated on individual pins fixed to the lever and wall 14 respectively. In an obvious manner, the screw and spring act against opposite sides of lever 55 at points below its pivotal axis passing through rod 54, to maintain the lever in an adjusted position. From the views of the apparatus as seen in FIGS. 3 and 4, it is evident that screw 60 can be selectively displaced within threaded collar 61 such that the tip of the screw either thrusts against lever 55 whereby spring 62 is further compressed and rake bar 44 shifts to the left to turn bars 33 clockwise, or tends to move away from lever 55 whereby the spring expands and the rake bar shifts to the right to turn bars 33 counterclockwise.

The spray means 20, shown in FIGS. 1 and 5, is arranged so that the water discharged therefrom is uniformly distributed over the grading structure 18. Provided for this purpose are two spray pipes 68 and 69, each having rows of outlet holes 70 directed generally downward and to either side. Two pipe clamping elements 73 are used to locate each pipe about in the middle of each half of the working area of the grading structure. A slot in these clamps permits them to be conveniently arranged, as indicated, on the upper edges of the casing walls 13 and 14, and a hole therein, equipped with a thumb screw fastener, receives the spray pipe structure. One end of each pipe is plugged, and to the opposite end thereof is joined a water feed arrangement. This arrangement includes a conventional water inlet connection 75, and flow control valves 76 and 77, operatively associated with spray pipes 68 and 69, respectively.

Constituting the working area of the grading mechanism 18, and comprising the surfaces of bars 33, are two operational sections 80 and 81, defined by the bars' quarter-round segments 34, and their spindle segments 35, respectively. It is evident from the showing in FIGS. 2 and 4, that, because of their particular shapes, segments 34 and 35 give the respective parts of the working area corresponding thereto, an extensive grid-like structure having a multiplicity of elongated narrow slots, and a smaller grid-like structure characterized by relatively short and wide slots. Consequently, ultization ofthe present invention requires only that the fingerlings supplied to the grader be deposited on the apron provided by plate 32 from where these fish are delivered, with the help of water streaming from spray pipe 69, to the grading bars 33. Located directly below the opening under casing 12, are two fish receiving tanks (not shown), having their separating partition, or walls, situated in line with the middle of deflecting element 24, such that the oppositely inclined sides of the deflecting element are each directed toward a different one of the tanks.

As the fingerlings traverse the grading structure 18, under the impetus of gravity and water applied to the working area from spray pipes 68 and 69, the smaller fingerlings eventually move down through the slots between segments 34 of section 80, and drop, or are deflected from one side of element 24, into one of the receiving tanks. However, the larger fingerlings remain above the bars 33 until they reach section 81 where the wider slots allow these fish to slip past spindles 35, and be deflected from the other side of element 24 into the second receiving tank. As was previously indicated, continuous streams of water issuing from holes 70 in pipes 68 and 69 of spray means 20, play on the fish and aid their movement across bars 33, and down through the slots of the working area sections 80 and 81. Casing 12 can be adjusted and fixed at a proper inclination for best operation by vertically displacing the receiving end of the casing and tightening the wing screws 27 against the foot plates 25, in an obvious manner.

Employing the adjustment control device 22 of the present invention makes possible the use of the invention for a range of sizing operations. Quarter-round segments 34, as seen in FIG. 4, are in an intermediate position whereat the slots formed thereby reject fingerlings over a predetermined size while allowing any other fingerling to pass therethrough. Adjustment of wing screw 60, shown in FIG. 3, such that it permits compressed spring 62 to drive the lower end of lever 55 away from the casing opening 47, becomes effective upon rake 44 and the pivot arms 40 to cause this linkage to rotate bars 33 counterclockwise. In its extreme outer adjustment, wing screw 60 brings about an almost complete closure of working section 80 as a result of the alignment of the wider parts of all the quarter-round segments 34. On the other hand, an adjustment of wing screw 60, fully displacing the end of lever 55 toward the slot 47, is effective to pivot the aforesaid linkage in the opposite direction whereby the quarter-round segments 34 are turned to their clockwise limit, and align their narrower parts to make available relatively wide slots in working section 80. Accordingly, adjustments of wing screw 60 may be made as needed to obtain slots in section 80 that are of any desired width within the available range.

Since the size of fingerlings may vary closely, some of them are likely to pass only partially through the slots of section 80 during a grading operation and become suspended by their gills. Fingerlings stuck in this manner may be seriously or fatally injured if they are not quickly and smoothly freed from their plight. Adjustment control device 22 is adapted by reason of its construction to permit immediate release of gilled fingerlings without subjecting them to possible injury. Normally, grading structure 18 is used with the slots in section 80 maintained less than fully open. Therefore, in the event it is noted that fingerlings are caught by their gills or otherwise stuck in the slots, it is only necessary for the operator to manually grip lever 55 against bar 53 such that the lower end of the lever moves away from the tip of wing screw 60 and into its limiting position against spring 62. As a result, rake bar 44 and pivot arms 40 drive segments 34 to their extreme clockwise position whereby they provide wider slots through which the stricken fish can pass without difficulty.

Bars 33, disclosed herein as having a quarter-round section, may be made of rectangular stock or other sectional shapes that are characterized by either regular or gradually changing forms. It is also evident that various corrosion resistant materials may be used in fabricating and assembling the structural parts of the present invention. Aluminum plates, bars and fasteners are desirable, although brass, stainless steel, or coated or plated materials would also be satisfactory. Therefore, while a preferred embodiment of the invention has been illustrated and described, it is understood that the invention is not limited thereby, but is susceptible to change in form and detail.

What is claimed is:

1. An apparatus for grading live fish according to size comprising an open casing of which one end includes means forming a receptacle in which said fish are initially received for subsequent movement through said apparatus, a sorting means connected to said casing and situated adjacent to said receptacles to receive fish therefrom, said sorting means having a multiplicity of displaceable elements arranged in said casing to define a first multiplicity of passages through whose openings pass from said casing only fish of less than a predetermined size, and a second multiplicity of passages through whose openings pass from said casing fish of other sizes, manipulatable means attached to said casing and operatively connected to said multiplicity of displaceable elements, said manipulatable means being adjustably maintainable in any one of a range of discrete positions to displace and situate said elements within a range of positions, whereby the size of the openings defined by said first multiplicity of passages, for accommodating the passage of fish therethrough, are changed.

2. The apparatus of claim 1 further comprising means having a plurality of perforated spray pipes attached to said casing above said displaceable elements, and means joining said pipes being operable to control the intensity of sprays issuing from the perforations thereof, adapted to wash said fish from said receptacle and across and through said displaceable elements to facilitate movement of said fish through said apparatus.

3. The apparatus of claim 1 wherein said displaceable elements are pivotally mounted so as to be rotatable about pivotal axes, each of said elements including a first portion eccentrically related to said pivotal axis, and a second portion concentrically related to said pivoted axis, said first portions of said elements being disposed in said casing to define said first multiplicity of passages, and said second portions of said elements being disposed in said casing to define said second multiplicity of passages.

4. The apparatus of claim 1 wherein a means operatively connecting said manipulatable means to said displaceable elements includes a crank arm fixed to each of said displaceable elements, a shiftable drive element and means pivotally connecting each one of said crank arms to said drive element, a further pivotal connection between said drive element and said manipulatable means whereby said operational connecting means changes the position of said displaceable elements in response to adjustments made to said manipulatable means.

5. The apparatus of claim 4 further comprising a fixture of said casing wherein said manipulatable means is operable, said fixture having secured therein a bearing member supporting for rotation thereon a lever of said manipulatable means, one end of said lever having means coupled to said drive element, the other end of said lever constituting an extended handle for said lever, means adjustably supported in said fixture and contacting one side of said lever between the bearing member therein and said coupled means thereof, said fixture supported means being adapted to impel said lever to an adjusted portion about said bearing member, an elastic means contacting a side of said lever opposite said one side and compressed between said opposite side and said casing so as to act counter to the impelling force of said fixture supported means whereby the position of said lever is maintained adjusted.

6. The apparatus of claim 5 wherein said lever is incrementally adjustable by said fixture supported means and directly adjustable by said extended handle between an initial position and a terminal position so that said lever operates said drive element and said crank arms fixed to said displaceable elements to modify the condition of the said first multiplicity of passages defined by said elements whereby the size of the openings thereof are variable from a predetermined magnitude less than maximum to a maximum magnitude.

7. An apparatus for grading live fish according to size comprising a casing having a fish sorting means operable therein, said sorting means including pivotal elements arranged spaced from each other in said casing to define a first plurality of openings each having a width selected from a predetermined range of widths, and a second plurality of openings each having a width greater than any one of said range of widths, pivotal and shiftable linkage means connected to said pivotal elements and operable to displace said pivotal elements to determine a width for said first plurality of openings from among said widths of said predetermined range, adjustable means flexibly coupled to said linkage means, said adjustable means being settable within a continuous range of positions wherein said adjustable means controls said linkage means to displace said pivotal elements to determine a width for each of said first plurality of openings, and a resilient means biasing said adjustable means into the position to which it was set.

8. The fish grading apparatus of claim 7 having operatively related with said fish sorting means thereof, a fish guiding device secured to said casing so as to structurally support one end thereof, comprising a first inclined surface positioned under said first plurality of openings, and a second inclined surface positioned under said second plurality of openings, and base plates adjustably secured to said casing so as to structurally support an end thereof opposite said one end above the latter.

References Cited by the Examiner

UNITED STATES PATENTS

| 413,176 | 7/90 | Thissell | 209—99 |
| 763,019 | 5/04 | Phinney | 209—17 |
| 1,438,783 | 12/22 | Pessell | 209—373 |
| 1,610,350 | 12/26 | Anderson et al. | 209—394 |
| 2,690,158 | 9/54 | Petty | 119—3 |
| 2,850,161 | 9/58 | Reilly | 209—99 |

FOREIGN PATENTS

| 1,151,404 | 7/63 | Germany. |

SAMUEL KOREN, Primary Examiner.

ALDRICH F. MEDBERY, Examiner.